(12) United States Patent
Skallebæk et al.

(10) Patent No.: US 8,928,137 B2
(45) Date of Patent: Jan. 6, 2015

(54) FLOW METER WITH ULTRASOUND TRANSDUCER DIRECTLY CONNECTED TO AND FIXED TO MEASUREMENT CIRCUIT BOARD

(71) Applicant: Kamstrup A/S, Skanderborg (DK)

(72) Inventors: Anders Skallebæk, Skanderborg (DK); Peter Schmidt Laursen, Skanderborg (DK); Søren Tønnes Nielsen, Solbjerg (DK)

(73) Assignee: Kamstrup A/S, Skanderborg (DK)

( * ) Notice: Subject to any disclaimer, the term of this patent is extended or adjusted under 35 U.S.C. 154(b) by 14 days.

(21) Appl. No.: 13/895,244

(22) Filed: May 15, 2013

(65) Prior Publication Data
US 2014/0338465 A1    Nov. 20, 2014

(51) Int. Cl.
H01L 23/12    (2006.01)
G01F 1/66    (2006.01)

(52) U.S. Cl.
CPC ..................... G01F 1/662 (2013.01)
USPC ......................................................... 257/704

(58) Field of Classification Search
USPC ........... 73/861.27, 861.26, 861.18, 643, 602, 73/620, 63.2; 438/125; 257/704
See application file for complete search history.

(56) References Cited

U.S. PATENT DOCUMENTS

| | | | | |
|---|---|---|---|---|
| 5,503,020 | A * | 4/1996 | Mandracchia | 73/643 |
| 6,612,306 | B1 | 9/2003 | Mault | |
| 7,166,910 | B2 * | 1/2007 | Minervini | 257/704 |
| 7,697,375 | B2 * | 4/2010 | Reiderman et al. | 367/168 |
| 8,629,005 | B1 * | 1/2014 | Minervini | 438/125 |
| 2008/0236296 | A1 | 10/2008 | Sonnenberg et al. | |
| 2008/0271543 | A1 | 11/2008 | Hecht et al. | |

FOREIGN PATENT DOCUMENTS

| | | |
|---|---|---|
| DE | 92 02 970 U1 | 9/1992 |
| DE | 198 10 798 | 9/1998 |
| DE | 100 48 959 | 3/2001 |
| DE | 100 51 534 A1 | 4/2002 |
| DE | 20 2007 011 493 U1 | 11/2007 |
| EP | 0 846 936 A1 | 6/1998 |
| EP | 0 890 826 A1 | 1/1999 |
| EP | 0 945 712 A1 | 9/1999 |
| EP | 0 952 430 A1 | 10/1999 |
| EP | 1 361 417 A2 | 11/2003 |

(Continued)

OTHER PUBLICATIONS

European Search Report for EP 09 15 7198 dated Jun. 18, 2009.

(Continued)

*Primary Examiner* — Jewel V Thompson
(74) *Attorney, Agent, or Firm* — Knobbe Martens Olson & Bear LLP

(57) ABSTRACT

An ultrasound flow meter unit arranged to measure a fluid flow rate is provided, where the unit comprises a circuit board 502 which comprises an electronic circuit, a first ultrasound transducer 506 and a first conducting path 564 electrically connected to first ultrasound transducer and the electronic circuit, wherein the circuit board is a multi-layer circuit board and the first conducting path 564 is arranged at least partially between a first layer 581 and a second layer 582. In a further embodiment, there is provided an upper electrically conducting layer 586 and/or a lower electrically conducting layer 588 which substantially covers, respectively, the upper surface of the first layer 581 and the lower surface of the second layer 582.

14 Claims, 3 Drawing Sheets

(56) References Cited

FOREIGN PATENT DOCUMENTS

| | | |
|---|---|---|
| EP | 1 482 284 A1 | 12/2004 |
| EP | 1 742 024 A1 | 10/2007 |
| EP | 1 983 311 A2 | 10/2008 |
| EP | 2 042 837 A1 | 4/2009 |
| EP | 2 083 250 A1 | 7/2009 |
| EP | 2 236 993 A1 | 10/2010 |
| EP | 2 339 301 A1 | 9/2011 |
| EP | 2 383 550 | 11/2011 |
| FR | 1 355 584 | 2/1964 |
| GB | 2 359 140 A | 8/2001 |
| GB | 2 423 363 | 8/2006 |
| WO | WO 95/04258 | 2/1995 |
| WO | WO 2004/111968 A2 | 12/2004 |
| WO | WO 2005/091433 A1 | 9/2005 |
| WO | WO 2008/053193 A1 | 5/2008 |
| WO | WO 2008/129050 A1 | 10/2008 |
| WO | WO 2009/029533 A1 | 3/2009 |
| WO | WO 2009/121885 A1 | 3/2009 |

OTHER PUBLICATIONS

European Search Report for EP 09 15 7174 dated Jun. 25, 2009.
European Search Report for EP 09 17 9932 dated Aug. 9, 2010.

* cited by examiner

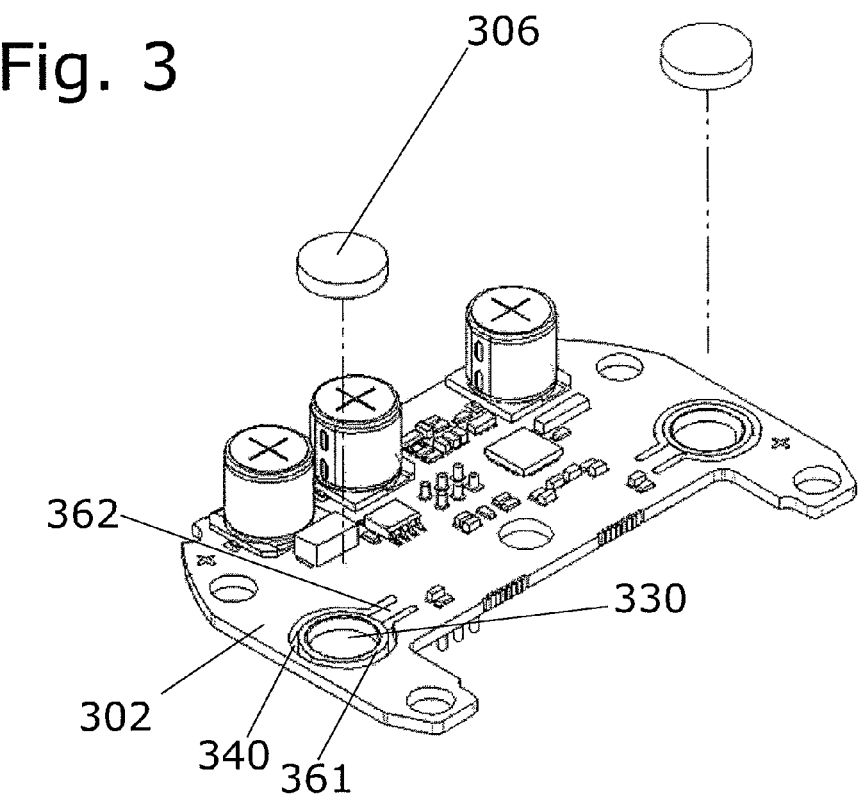
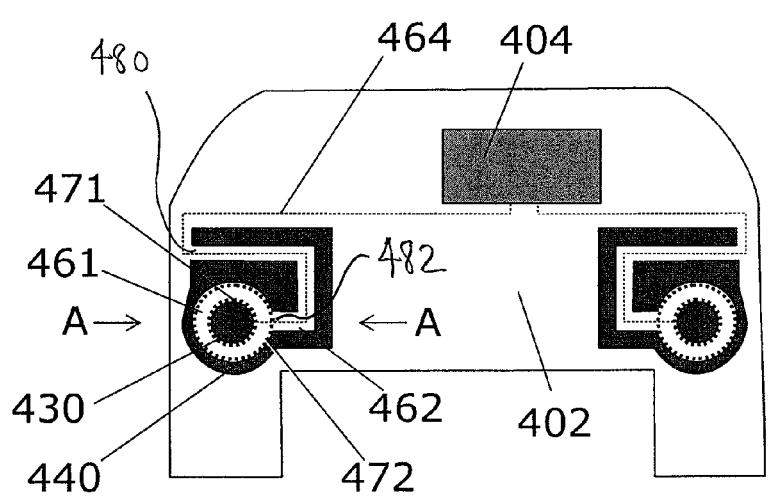

FLOW METER WITH ULTRASOUND TRANSDUCER DIRECTLY CONNECTED TO AND FIXED TO MEASUREMENT CIRCUIT BOARD

FIELD

The invention relates to an ultrasound flow meter unit with a multi-layer circuit board with an ultrasound transducer electrically connected and fixed thereto.

BACKGROUND

An ultrasound flow meter may comprise a unit comprising one or more ultrasound transducers, used for sending and receiving an ultrasound signal, and an electronic circuit for operation of the ultrasound transducers. An example of such ultrasound flow meter unit is described in WO 2010/112030 A1. It would be advantageous to provide a unit which is further improved.

SUMMARY OF THE INVENTION

The present disclosure provides an ultrasound flow meter unit. It may be seen as an improvement that the first conducting path is arranged at least partially between the first layer and the second layer, since the first electrical path is structurally shielded by the first and second layer and therefore less susceptible to the presence of electromagnetic interference (EMI) from external electromagnetic fields. This may lead to improved data quality.

The first conducting path may be arranged for conducting electrical current between the first layer and the second layer and in a direction being parallel with a plane of the circuit board, and may be connected to the first electrical terminal and/or the electronic circuit through one or more vias, such as micro-vias.

By 'electrically conducting fixing means' may in exemplary embodiments be understood any one of: solder, electrically conducting glue, an electrically conducting clip. Different types of these fixing means may be used to fix and connect the first and second electrical terminal of the first ultrasound transducer and possibly a corresponding second ultrasound transducer.

By a 'multi-layer' circuit board may in general be understood a circuit board with multiple layers, such as a first and second layer. The multiple layers may be arranged to be parallel. One or more of the multiple layers may be electrically insulating. In particular embodiments, the multi-layer circuit board comprises a substrate made up of layers of printed circuits separated by layers of insulation.

It is generally understood that the unit may further comprise a second ultrasound transducer, wherein the electronic circuit is further arranged for operating both of the first and second ultrasound transducer.

In an embodiment, there is provided an ultrasound flow meter unit wherein an upper surface of the first layer has a surface normal pointing away from the second layer, and wherein a lower surface of the second layer has a surface normal pointing away from the first layer, and wherein an upper electrically conducting layer, such as a metal layer, covers a substantial part of the upper surface of the first layer, and/or wherein a lower electrically conducting layer, such as a metal layer, covers a substantial part of the lower surface of the second layer. In a particular embodiment the upper electrically conducting layer and the lower electrically conducting layer are electrically connected, e.g. via the edge or via one or more vias through the layers. The upper or lower electrically conducting layers at least partially shield the first conducting path from external electromagnetic fields which could otherwise penetrate through the first layer and/or the second layer, and electrically influence the first conducting path, which may in turn influence signals between the first ultrasound transducer and the electronic circuit and degrade data quality. It is understood that the upper and/or lower electrically conducting layer may be a solid layer or may be realized by a connected network of electrically conductive paths, such as a grid. In a particular embodiment the upper and/or lower electrically conducting layer may act as a Faraday cage.

In an embodiment, there is provided an ultrasound flow meter unit wherein the second conducting path is provided by or connected to the upper electrically conducting layer and/or the lower electrically conducting layer, so that the upper electrically conducting layer and/or the lower electrically conducting layer are electrically connected to the second electrical terminal of the first ultrasound transducer. In this way the second electrical terminal may be connected to a relatively stable electrical potential which may effectively function as reference point from which other voltages are measured, such as effectively function as ground, even if none of the upper and lower electrically conducting layers are earth grounded.

In an embodiment, there is provided an ultrasound flow meter unit wherein the upper electrically conducting layer and/or the lower electrically conducting layer is electrically connected to an electrical ground of the electronic circuit. It is noted that the upper electrically conducting layer and/or the lower electrically conducting layer may furthermore be connected to an external ground through a casing.

In an embodiment, there is provided an ultrasound flow meter unit wherein the first ultrasound transducer comprises a wrap-around electrode. By 'wrap-around electrode' may be understood an electrode which extends over the edge to the side of the transducer or the other side of the transducer. An advantage thereof may be that the first and second electrical terminals may be electrically accessed from the same side of the ultrasound transducer.

In an embodiment, there is provided an ultrasound flow meter unit wherein a through-going opening in the circuit board substantially encircles the first portion of the circuit board adjacent the first ultrasound transducer, such as encircles at least 180 degrees, 225 degrees, 270 degrees, 315 degrees around said first portion of the circuit board, and wherein a second portion of the circuit board serves to mechanically connect said first portion to a remaining portion of the circuit board, wherein a width of a cross-section of the second portion is smaller than a diameter of the first ultrasound transducer. An advantage of this may be that it is possible for the circuit board to adapt to thermal extensions and contractions of the piezo-electric ultrasound transducer element. An electrical current may in some embodiments flow from the first portion to the remaining portion via the second portion. By 'width of a cross-section of the second portion' may be understood the distance in the plane of the circuit board of a cross-section of the second portion, wherein the cross-section is orthogonal to a direction of a current led via the second portion from the first portion to the remaining portion of the circuit board. By 'diameter of the first ultrasound transducer' is understood a diameter in the plane of the circuit board, or a corresponding characteristic length for transducers of non-circular shape.

In an embodiment, there is provided an ultrasound flow meter unit wherein a distance along the second portion from the first portion to the remaining portion of the circuit board is larger, such as 1.5, 2, 3, 4, 5 or 10 times larger, than said diameter of the first ultrasound transducer. An advantage of a relatively long second portion may be that it facilitates larger freedom of movement of the first portion relative to the remaining portion. The second portion may be rectilinear or curvilinear or piecewise rectilinear. An advantage of a non-straight second portion may be that it provides more degrees of freedom to the movement of the first portion with respect to the remaining portion.

In an embodiment, there is provided an ultrasound flow meter unit comprising the electrically conducting fixing means which provides an electrical connection between the first electrical terminal and the first conducting path and the electrically conducting fixing means which provides an electrical connection between the second electrical terminal and the second conducting path, wherein said electrically conducting fixing means are arranged concentrically with respect to each other. The first ultrasound transducer may have the first and second electrical terminals placed concentrically in relation to each other and may have the first and second electrical terminals arranged on the same side of the first ultrasound transducer. This enables full electrical connection of the ultrasound transducer to the circuit board in a simple surface mounting technology (SMT) mounting process using only one side of the transducer for both electrical terminals.

In an embodiment, there is provided an ultrasound flow meter arranged to measure a flow rate of a fluid flowing through a measuring tube, wherein the flow meter comprises the ultrasound flow meter unit. In an embodiment the a flow meter comprises a housing with a measuring tube arranged inside, and wherein the ultrasound flow meter unit is arranged in relation to the housing, wherein the housing may be formed of metal, brass, stainless steel or polymeric material.

Some embodiments disclosed herein include an ultrasound flow meter unit comprising a first ultrasound transducer formed from a monolithic body of piezoelectric material having a first electrical terminal and a second electrical terminal a multi-layer circuit board comprising: at least a first layer and a second layer, the first layer having an upper surface facing away from the second layer and the second layer having a lower surface facing away from the first layer, wherein the upper surface of the first layer is at least partially covered by an upper conductive layer and the lower surface of the second layer is at least partially covered by a lower conductive layer, and wherein the at least first and second layers comprise one or more vias adapted to provide electrical contact from one side of the at least first and second layers to another side of the at least first and second layers respectively; a first conducting path electrically connected to the first electrical terminal disposed at least partially between the first layer and the second layer a second conducting path electrically connected to the second electrical terminal; and wherein the monolithic body is mechanically fixed to a first portion of the multi-layer circuit board.

In some embodiments, the monolithic body is mechanically fixed to the multi-layer circuit board by a first electrically conductive fixing member which provides an electrical connection between the first electrical terminal and the first conducting path.

In some embodiments, the monolithic body is mechanically fixed to the multi-layer circuit board by a second electrically conductive fixing member which provides an electrical connection between the second electrical terminal and the second conducting path.

In some embodiments, the second conducting path is connected either to the upper electrically conducting layer or the lower electrically conducting layer.

In some embodiments, at least one of the upper electrically conducting layer or the lower electrically conducting layer is electrically connected to an electrical ground.

In some embodiments, the first ultrasound transducer comprises a wrap-around electrode.

In some embodiments, the first and second electrically conductive fixing members are selected from the group consisting of: solder, electrically conducting glue, and an electrically conducting clip.

In some embodiments, the second electrical terminal is arranged on a side of the first ultrasound transducer which faces away from the multi-layer circuit board.

In some embodiments, the multi-layer circuit board is formed with a void therein which substantially encircles the first portion of the multi-layer circuit board to which the first ultrasonic transducer is mechanically fixed.

In some embodiments, the multi-layer circuit board further comprises a second portion mechanically connected to the first portion of the multi-layer circuit board and to a remaining portion of the multi-layer circuit board, wherein a width of a cross-section of the second portion is smaller than a diameter of the first ultrasound transducer.

In some embodiments, a distance along the second portion from the first portion to the remaining portion of the circuit board is larger than the diameter of the first ultrasound transducer.

In some embodiments, the second portion of the multi-layer circuit board comprises at least two piecewise rectilinear sections which are connected at an angle with respect to each other.

In some embodiments, the first and second electrically conducting fixing members are arranged concentrically with respect to each other.

Some aspects disclosed herein include an ultrasound flow meter adapted to measure a flow rate of a fluid flowing through a measuring tube, comprising the ultrasound flow meter unit described herein.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
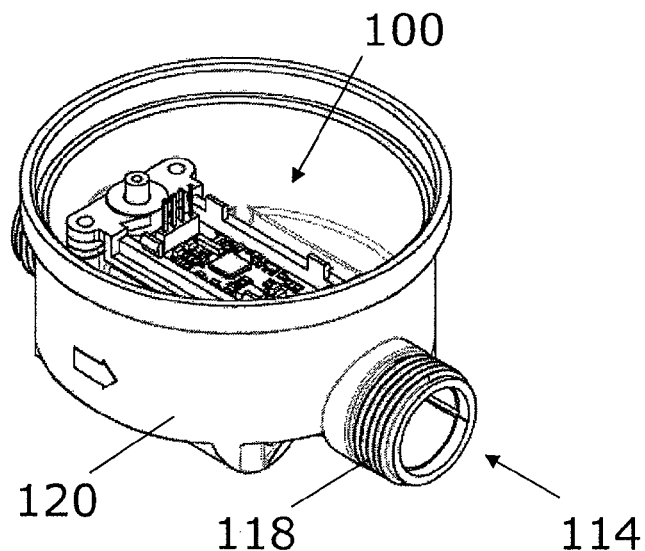
FIG. 1 illustrates an ultrasound flow meter.

FIG. 1 shows a perspective view of an ultrasound flow meter 101 with a polymeric flow meter housing 120, with a through-going opening 114 adapted for fluid flow and with a measuring tube arranged inside (see 203 on FIG. 2), and a mechanically separate part being an ultrasound flow meter unit 100 comprising a circuit board with an electronic circuit and piezoelectric ultrasound transducers.

Figure 2:
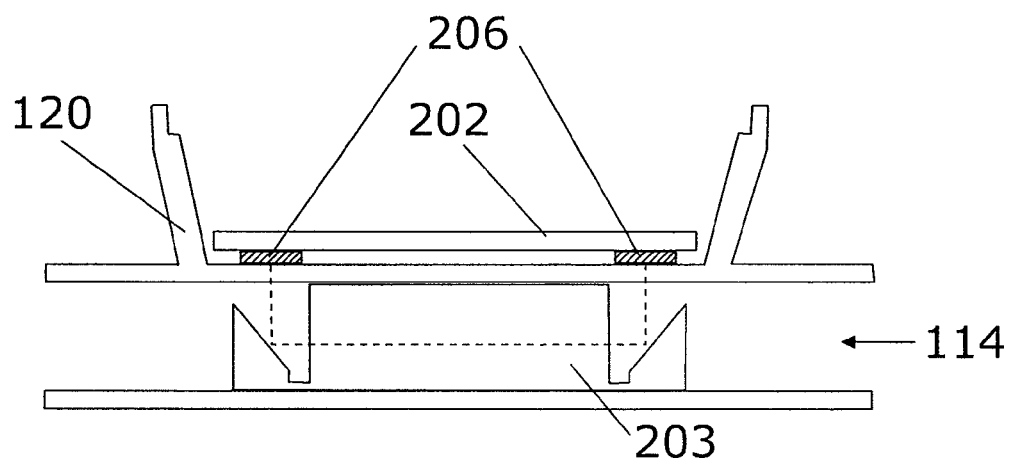
FIG. 2 shows a cross-section of the ultrasound flow meter of FIG. 1, FIGS. 3-4 show a perspective view and a top view, respectively, of an ultrasound flow meter unit before mounting of the first and second ultrasound transducer.

FIG. 2 shows a cross-section of the flow meter housing of FIG. 1, where two ultrasound transducers 206 are shown mounted on a circuit board 202, and arranged for sending/receiving ultrasonic signals to/from each other via reflectors of the measuring tube 203.

FIG. 3 is a perspective view of a circuit board 302 where a through-going opening 340 in the circuit board 302 substantially encircles a first portion 361 of the circuit board 302, and wherein a second portion 362 of the circuit board serves to mechanically connect said first portion 361 to a remaining portion of the circuit board. The width of a transverse cross-section of the second portion 362 is smaller than a diameter of the first ultrasound transducer 306. An advantage of such relatively small width of the second portion may be that the second portion becomes so flexible that it may be bent around its end points so that the first portion may move slightly with respect to the remaining portion of the circuit board. The first portion 361 has a central through-going hole 330.

FIG. 4 is a schematic top view of an ultrasound flow meter unit before mounting of the first and second ultrasound transducers. The figure shows a circuit board 402 comprising an electronic circuit 404, a first conducting path 464 for electrically connecting a first electrical terminal on the first ultrasound transducer with the electronic circuit 404, a first portion 461 which comprises a first electrode 471 for electrically connecting the first electrical terminal and the first conducting path 464, and a second electrode 472 for electrically connecting the second electrical terminal and the second conducting path. The first electrode 471 and the second electrode 472 are arranged concentrically with respect to each other. Each may comprise an annular copper trace on the upper surface of the circuit board. In the implementation of FIG. 4, the solder mask over the traces has a series of openings along each of the annular traces such that the first and second electrodes may be formed by a series of solder bumps which serve as the electrically conducting fixing means for mechanically fixing the transducers to the circuit board. As illustrated further below in FIGS. 5-7, the outer trace 472 may be formed as part of a ground plane provided over the upper surface of the printed circuit board 402 that is covered with solder mask having openings the regions of the windows positioned along the outer annular trace 472. The inner trace may connect to the first conducting path 464, which may be provided on an inner layer of the printed circuit board. This connection may be made through one or more vias (not shown) connecting the inner annular trace 471 to the conducting path 464. The conducting path 464 may also form an annular trace on the inner layer under the annular trace 471 at its termination on the first portion 461. In this implementation, the conducting path 464 may be electrically connected to the annular trace 471 by a series of circumferentially distributed vias positioned between the annular trace 471 and the inner layer annular trace formed by an end portion of the conducting path 464. The inner annular trace 471 and outer annular trace 472 are separated by a gap providing electrical isolation therebetween.

The figure furthermore shows that the first portion 461 has a central through-going hole 430 and around its periphery a through-going opening 440. The through-going opening 440 is arranged so that the second portion 462 connecting the first portion 461 with the remaining portion of the circuit board is piecewise linear which allows the position of the first portion 461 to vary in several directions both parallel to and perpendicular to the plane formed by the main body of the printed circuit board 402 since each piecewise linear segment may be bend slightly at its corners and around the point 480 where it connects to the main planar body of the circuit board 402. A similar advantage may be achieved with a curvilinear second portion 462, such as a spiral shaped second portion. It is thus beneficial if the second portion 462 is substantially longer measured along its longitudinal axis from the point 480 where it connects to the main body of the printed circuit board 402 and the point 482 where it connects to the portion 461 on which the transducer is to be mounted relative to its transverse width. The longitudinal length of the second portion 462 may be at least 5 times longer than the transverse width, at least 10 times longer than the transverse width, or at least 20 times longer than the transverse width. As noted above, it is also beneficial if the direction of the longitudinal axis changes along the length of the second portion 462. As noted above, the implementation of FIG. 4 has corners to form a squared-off U shape, where the direction of the longitudinal axis moving from the point 480 to the point 482 takes on three different discrete values. As also noted above, the second portion could have a curved shape between point 480 and point 482.

Figure 5:
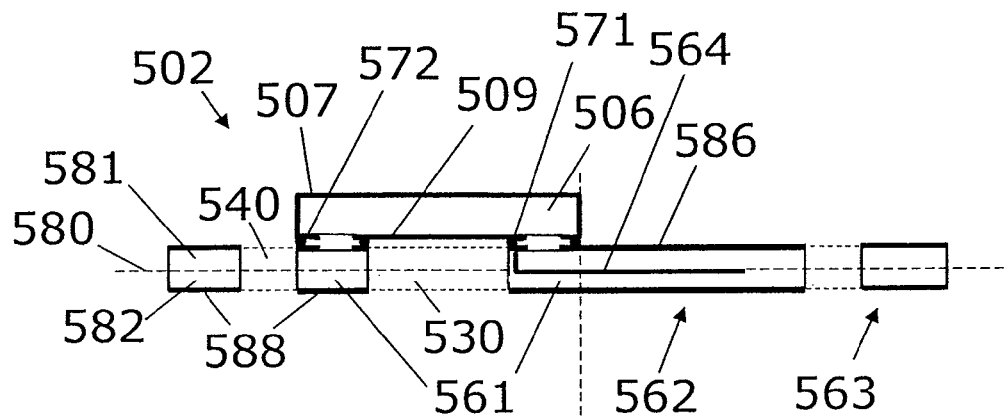
FIGS. 5-7 show different types of ultrasound transducers mounted on an ultrasound flow meter unit as shown in FIGS. 3-4.
Figure 6:
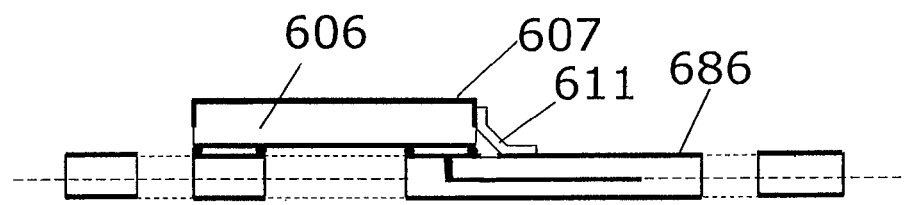
Figure 7:
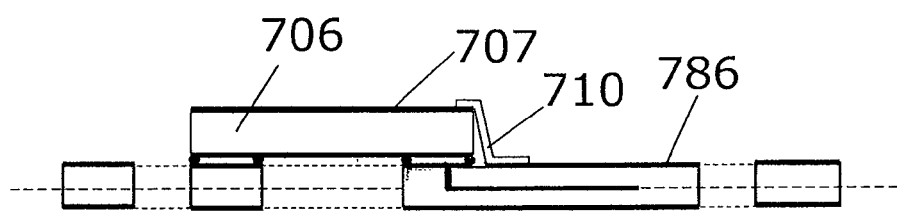

FIGS. 5-7 shows a cross-sectional view in the plane of a circuit board similar to the circuit board in FIG. 4 (along the section A-A as indicated in FIG. 4).

FIG. 5 shows the first ultrasound transducer 506 with first electrical terminal 509 and second electrical terminal 507. The ultrasound transducer comprises a wrap-around electrode so that the second electrical terminal 507 is effectively an electrode which is wrapped around the transducer so as to be electrically accessible from the same side of the transducer as the first electrical terminal 509. The figure furthermore shows a circuit board 502 which comprises a first layer 581 and a second layer 582 which are shown on either side of the dotted line 580. A first conducting path 564 is electrically connected to the first electrical terminal 509 and arranged between the first layer 581 and the second layer 582. A second conducting path electrically connected to the second electrical terminal 507 is given by an upper electrically conducting layer 586. In some embodiments, the upper electrically conducting layer 586 may cover at least the portion of the upper surface of the first layer 581 which is adjacent to or covers the conducting path 464, forming an electromagnetic shield. In some embodiments, the upper electrically conducting layer 586 may substantially cover the upper surface of the first layer 581, such that the upper electrically conducting layer 586 is present over the entire upper surface of the first layer 581 of the circuit board except where there is a component attached to the circuit board or where there is a void, through hole, or via formed in the circuit board.

Furthermore, in some embodiments, a lower electrically conducting layer 588 may cover at least the portion of the lower surface of the second layer 582 which is adjacent to or covers the conducting path 464, forming an electromagnetic shield. In some embodiments, the lower electrically conducting layer 588 may substantially cover the lower surface of the second layer 582, such that the lower electrically conducting layer 588 is present over the lower surface of the second layer 582 of the circuit board except where there is a component attached to the circuit board or a void, through hole, or via in the circuit board. In some embodiments, the upper electrically conducting layer 586 and the lower electrically conducting layer 588 may correspond or mirror each other, being disposed on opposite surfaces of the circuit board respectively. In some embodiments, the upper and lower electrically conducting layers 586, 588 may cover the portion of the first and second layers 581, 582 which form the first portion 461 and the second portion 462 of the circuit board, and which connect to the main body of the printed circuit board 402.

The figure also shows the first portion 561 which comprises a first electrode 571, a second electrode 572, a central through-going hole 530 and around its periphery a through-going opening 540. Furthermore is shown a second portion 562 and part of the remaining portion 563. In the present embodiment, electrically conducting fixing means, being solder, mechanically fix and provide electrical connections between the first electrical terminal 509 and the first conducting path 564, via the first electrode 571, and respectively, the second electrical terminal 507 and the second conducting path, via the second electrode 572.

FIG. 6 is similar to FIG. 5, except that the ultrasound transducer 606 comprises an edge electrode, so that the second electrical terminal 607 is effectively an electrode which extends to a side of the transducer so as to be electrically accessible from this side. An electrical connector 611 electrically connects the second electrical terminal 607 with the upper electrically conducting layer 686.

FIG. 7 is similar to FIGS. 5-6, except that the second electrical terminal is placed on a side of the first ultrasound transducer facing away from the circuit board, and wherein an electrical connection between the second electrical terminal 707 and the upper electrically conducting layer 786 is provided via a clip 710 which may serve to mechanically fix the first ultrasound transducer 706.

FIGS. 4 to 7 shows embodiments where the conducting path which carries the signal to and from the electronic circuit is placed inside a multilayer PCB and shielded from external electromagnetic fields by the electrically conducting ground layers which cover the upper and lower surfaces.

Although the present invention has been described in connection with preferred embodiments, it is not intended to be limited to the specific form set forth herein. Rather, the scope of the present invention is limited only by the accompanying claims. In this section, certain specific details of the disclosed embodiments are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims however the inclusion of the reference signs is only for clarity reasons and should not be construed as limiting the scope of the claims.

The invention claimed is:

1. An ultrasound flow meter unit comprising:
   a first ultrasound transducer formed from a monolithic body of piezoelectric material having a first electrical terminal and a second electrical terminal
   a multi-layer circuit board comprising:
      at least a first layer and a second layer, the first layer having an upper surface facing away from the second layer and the second layer having a lower surface facing away from the first layer, wherein the upper surface of the first layer is at least partially covered by an upper conductive layer and the lower surface of the second layer is at least partially covered by a lower conductive layer, and wherein the at least first and second layers comprise one or more vias adapted to provide electrical contact from one side of the at least first and second layers to another side of the at least first and second layers respectively;
      a first conducting path electrically connected to the first electrical terminal disposed at least partially between the first layer and the second layer
      a second conducting path electrically connected to the second electrical terminal; and
   wherein the monolithic body is mechanically fixed to a first portion of the multi-layer circuit board.

2. The ultrasound flow meter unit of claim 1, wherein the monolithic body is mechanically fixed to the multi-layer circuit board by a first electrically conductive fixing member which provides an electrical connection between the first electrical terminal and the first conducting path.

3. The ultrasound flow meter unit of claim 2, wherein the monolithic body is mechanically fixed to the multi-layer circuit board by a second electrically conductive fixing member which provides an electrical connection between the second electrical terminal and the second conducting path.

4. The ultrasound flow meter unit according to claim 1, wherein the second conducting path is connected either to the upper electrically conducting layer or the lower electrically conducting layer.

5. The ultrasound flow meter unit according to claim 1, wherein at least one of the upper electrically conducting layer or the lower electrically conducting layer is electrically connected to an electrical ground.

6. The ultrasound flow meter unit according to claim 1, wherein the first ultrasound transducer comprises a wrap-around electrode.

7. The ultrasound flow meter unit according to claim 3, wherein the first and second electrically conductive fixing members are selected from the group consisting of: solder, electrically conducting glue, and an electrically conducting clip.

8. The ultrasound flow meter unit according to claim 1, wherein the second electrical terminal is arranged on a side of the first ultrasound transducer which faces away from the multi-layer circuit board.

9. The ultrasound flow meter unit according to claim 1, wherein the multi-layer circuit board is formed with a void therein which substantially encircles the first portion of the multi-layer circuit board to which the first ultrasonic transducer is mechanically fixed.

10. The ultrasound flow meter unit according to claim 9 wherein the multi-layer circuit board further comprises a second portion mechanically connected to the first portion of the multi-layer circuit board and to a remaining portion of the multi-layer circuit board, wherein a width of a cross-section of the second portion is smaller than a diameter of the first ultrasound transducer.

11. An ultrasound flow meter unit according to claim 10, wherein a distance along the second portion from the first portion to the remaining portion of the circuit board is larger than the diameter of the first ultrasound transducer.

12. An ultrasound flow meter unit according to claim 10, wherein the second portion of the multi-layer circuit board comprises at least two piecewise rectilinear sections which are connected at an angle with respect to each other.

13. An ultrasound flow meter unit according to claim 1, wherein said the first and second electrically conducting fixing members are arranged concentrically with respect to each other.

14. An ultrasound flow meter adapted to measure a flow rate of a fluid flowing through a measuring tube, comprising the ultrasound flow meter unit of claim 1.

* * * * *